United States Patent
Abadjian

(10) Patent No.: US 8,291,619 B2
(45) Date of Patent: Oct. 23, 2012

(54) SKATEBOARD SHOES

(75) Inventor: Joseph Haroutioun Abadjian, Pasadena, CA (US)

(73) Assignee: DC Shoes, Inc., Huntington Beach, CA (US)

( * ) Notice: Subject to any disclaimer, the term of this patent is extended or adjusted under 35 U.S.C. 154(b) by 565 days.

(21) Appl. No.: 12/506,071

(22) Filed: Jul. 20, 2009

(65) Prior Publication Data
US 2010/0011622 A1 Jan. 21, 2010

Related U.S. Application Data

(60) Provisional application No. 61/082,172, filed on Jul. 18, 2008.

(51) Int. Cl.
*A43B 3/00* (2006.01)
*A43B 13/04* (2006.01)

(52) U.S. Cl. ............. 36/113; 36/115; 36/32 R; 36/59 C; 36/25 R

(58) Field of Classification Search .................... 36/113, 36/115, 32 R, 59 C, 25 R, 31, 59 R
See application file for complete search history.

(56) References Cited

U.S. PATENT DOCUMENTS

| | | | |
|---|---|---|---|
| 5,862,614 A * | 1/1999 | Koh | 36/31 |
| 6,076,283 A * | 6/2000 | Boie | 36/59 C |
| 6,931,768 B2 | 8/2005 | Baek | |
| D607,191 S * | 1/2010 | McClaskie | D2/953 |
| 7,650,707 B2 * | 1/2010 | Campbell et al. | 36/127 |
| 7,665,231 B2 * | 2/2010 | Abadjian et al. | 36/29 |
| 2002/0112374 A1 | 8/2002 | Gillespie | |
| 2003/0115776 A1 | 6/2003 | Chu | |

FOREIGN PATENT DOCUMENTS

JP 2008-093016 4/2008

* cited by examiner

*Primary Examiner* — Ted Kavanaugh
(74) *Attorney, Agent, or Firm* — Snell & Wilmer LLP

(57) ABSTRACT

A shoe comprising a single molded sole having a lateral section, positioned at a front outer portion of the sole, the lateral section made of a first rubber material, a medial section, positioned at a front inner portion of the sole and positioned adjacent to the lateral section, the medial section made of a third rubber material, a heel section, positioned at a rear portion of the sole, the heel section made of the third rubber material, and an arch section, positioned between the lateral section or the medial section and the heel section, the arch section made of a second rubber material.

15 Claims, 2 Drawing Sheets

SKATEBOARD SHOES

CLAIM OF PRIORITY UNDER 35 U.S.C. §119

The present Application for Patent claims priority to U.S. Provisional Patent Application No. 61/082,172 filed on Jul. 18, 2008 and assigned to the assignee hereof and hereby expressly incorporated by reference herein.

BACKGROUND

1. Field

The invention relates to skateboarding shoes and more particularly to the soles of skateboarding shoes.

2. Related Art

A skateboard is controlled primarily through the rider's feet. Greater control of a skateboard may be provided by appropriate footwear, which allows the rider to perform more skateboard tricks, such as ollies, kickflips, and crooks, with a greater degree of mastery. Any shoe designed for use during skateboarding should be designed to appropriately transmit forces between the rider's foot and the skateboard. In other words, the shoe should be designed to account for the required force transfer used by a skateboard rider to control the skateboard. In addition, the shoe should be designed to provide the rider with a better grip of the skateboard and the ground. The skateboard shoes described below use soles that provide an appropriate grip between the shoe and a skateboard and facilitate appropriate force transfer between the rider's foot and the skateboard.

SUMMARY

The shoes described below provide for improved control, traction, and durability during skateboarding. In one embodiment, a shoe comprising a single molded sole has a lateral section, positioned at a front outer portion of the sole, the lateral section made of a first rubber material, a medial section, positioned at a front inner portion of the sole and positioned adjacent to the lateral section, the medial section made of a third rubber material, a heel section, positioned at a rear portion of the sole, the heel section made of the third rubber material, and an arch section, positioned between the lateral section or the medial section and the heel section, the arch section made of a second rubber material.

In one embodiment, a single molded sole of a shoe including a lateral section made of a butyl rubber material, a medial section, positioned adjacent to the lateral section, the medial section made of a carbon rubber material, a heel section made of the carbon rubber material; and an arch section, positioned between the medial section and the heel section, the arch section made of a gum rubber material.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Apparatus that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Figure 1:
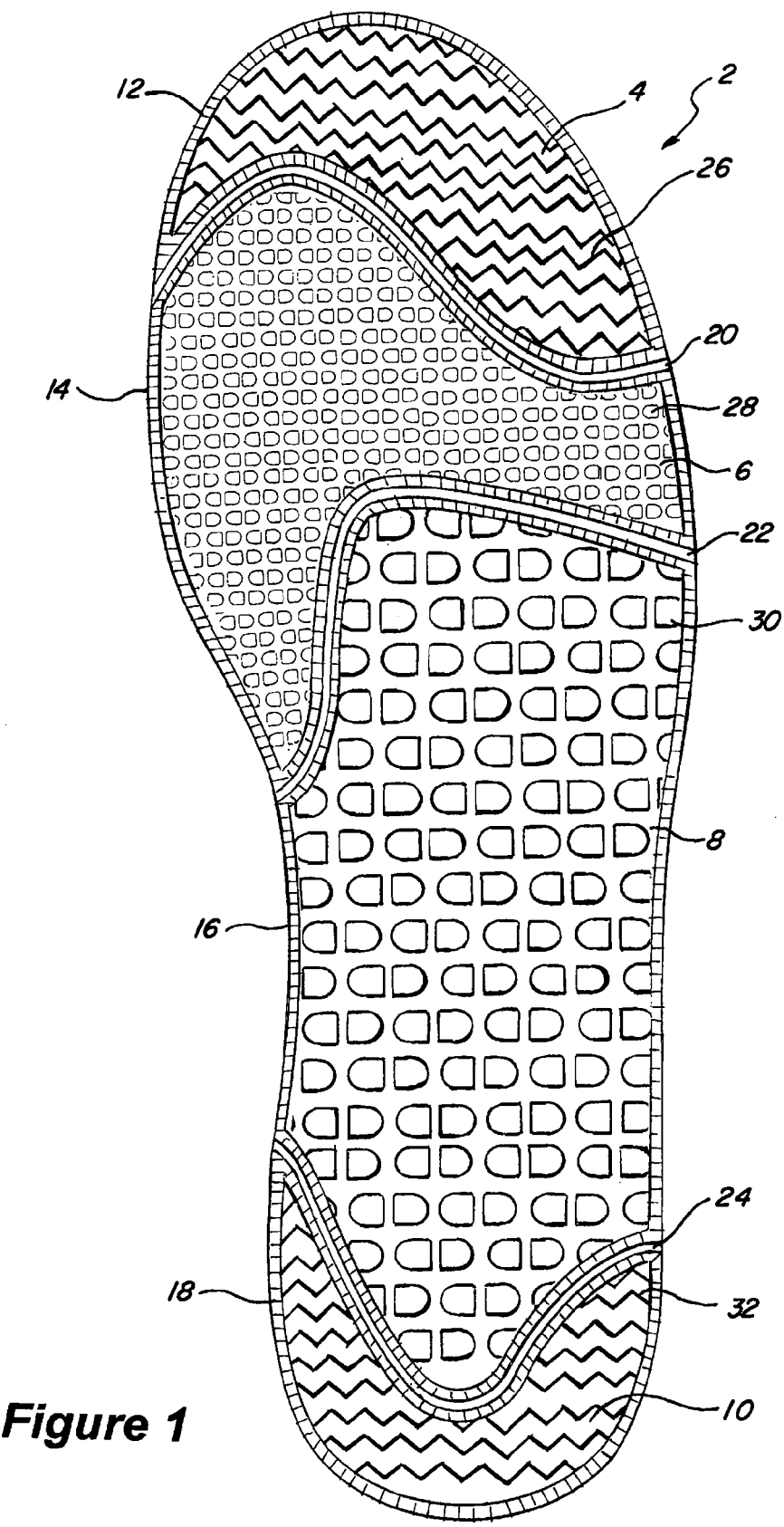
FIG. 1 shows a bottom view of a sole of a skateboarding shoe according to a first embodiment of the invention.

FIG. 1 is a bottom view of a sole 2 of a skateboard shoe according to a first embodiment of the invention. As seen in FIG. 1, the sole 2 had an upper sole section 4, an upper middle sole section 6, a lower middle sole section 8, and a lower sole section 10. Even though four sections are shown in FIG. 1, the sole 2 may have one, two, three, four, five or six sections each being made out of the same or a different material depending upon the applications. The thickness of each section can be approximately 4 millimeters. Alternatively, each section can have a different thickness to accommodate for different wear and tear due to skateboarding.

The upper sole section 4 and the upper middle sole section 6 can be divided by an upper channel 20. The upper channel 20 can be curved such that it is higher on a first side than on a second side. The upper middle sole section 6 and the lower middle sole section 8 can be divided by a middle channel 22. The middle channel 22 can be curved such that it is higher on a first side than on a second side. The lower middle sole section 8 and the lower sole section 10 can be divided by a lower channel 24. The lower channel 24 can be curved such that the middle is lower than a first side and a second side.

The upper sole section 4 can also have a flange 12 and a pattern 26. The pattern 26, for example, can be zig-zag or sharp waves. The upper sole section 4 can be made of a material such as climbing rubber with a predetermined hardness, such as soft. In one embodiment, the upper sole section 4 is made of a butyl rubber material. The upper sole section 4 has a relatively soft durometer value. The softer material allows the upper sole section 4 to better grip an object such as a skateboard or the ground. It can be advantageous to have the upper sole section 4 be soft because the user will often grip with his toes which is a section that the upper sole section 4 can encompass.

The upper sole section 4 may be positioned on a forefoot region and a lateral side of the sole 2. The upper sole section 4 is referred to as the ollie area by skateboarders because it is the area of the shoe to perform an ollie. The upper sole section 4 may also be referred to as a toe section 4 to encompass the toes of a user's foot. The upper sole section 4 may also be treated or coated with substances to provide a moderate degree of tackiness. In one embodiment, the butyl rubber material provides the required tackiness. The relative softness (and tackiness, if enhanced) of the upper sole section 4 enhances the friction or "grip" between the skateboard shoe and the ground during all maneuvers in which the skateboarder attempts to apply lateral force to the skateboard or the ground with a swiping or lateral movement of the foot across the skateboard or the ground.

The upper middle sole section 6 can have a flange 14 and a pattern 28. The flange 14 is used to outline the upper middle sole section 6. The pattern 28, for example, can be two semicircles adjacent to each other of a predetermined size. The upper middle sole section 6 can be made of a material such as a gum rubber material with a predetermined hardness, such as that between the hardness of the lower sole section 10 and the hardness of the upper sole section 4. The material with predetermined hardness for the upper middle sole section 6, for example, can be chosen to balance durability and grip. The upper middle sole section 6 may also be referred to as a ball section 6 to encompass the ball of a user's foot.

The lower middle sole section 8 can also have a flange 16 and a pattern 30. The flange 16 is used to outline the lower middle sole section 8. The pattern 30, for example, can be two semi-circles adjacent to each other of a predetermined size. The pattern 30, i.e., the predetermined size of the two semi-circles, for example, can be larger than the pattern 28 of the upper middle sole section 6. The lower middle sole section 8 can be made of a material, such as a gum rubber material with a predetermined hardness, such as that between the hardness of the lower sole section 10 and the hardness of the upper sole section 4. The material with predetermined hardness for the lower middle sole section 8, for example, can be chosen to balance durability and grip. The lower middle sole section 8 may also be referred to as an arch section 8 to encompass the arch of a user's foot.

The lower sole section 10 can have a flange 18 and a pattern 32. The flange 18 is used to outline the lower sole section 10. The pattern 32, for example, can be zig-zag or sharp waves. The lower sole section 10 can be made of a material such as a carbon rubber material with a predetermined hardness, such as hard. This can allow the user to brake better while using an object such as a skateboard. The lower sole section 10 is sometimes dragged on the ground to slow down the skateboard during maneuvers. It can be advantageous to have the lower sole section 10 be hard because the user will often brake with the back of his foot which is a section that the lower sole section 10 can encompass. The carbon rubber material is a very durable and hard material and can better withstand skidding and dragging of the lower sole section 10 of the sole 2. The lower sole section 10 may also be referred to as a heel section 10 to encompass the heel of a user's foot.

The upper channel 20, the middle channel 22, and the lower channel 24 can allow the upper sole section 4, the upper middle sole section 6, the lower middle sole section 8, and the lower sole section 10 to bend at different angles. This can help the user when the user is trying to arch his foot to perform various activities such as stunts on a skateboard. The channels are also used to separate, divide or differentiate between the different sections.

Furthermore, the upper channel 20, the middle channel 22, and the lower channel 24 can be used to appropriately separate the upper sole section 4, the upper middle sole section 6, the lower middle sole section 8, and the lower sole section 10 so that the upper sole section 4, the upper middle sole section 6, the lower middle sole section 8, and the lower sole section 10 are strategically shaped and placed to allow for the desired grip, braking ability, and durability.

The sole 2, for example, is a single molded sole. To create the sole 2, for example, the upper sole 4, the upper middle sole 6, the lower middle sole 8, and the lower sole 10 are placed on a thin sheet of gum rubber. The sole 2 is then attached, such as by glue, to other various parts (e.g., an upper or a mid-sole) of a shoe (not shown).

Furthermore, the sole 2 can be used for a variety purposes aside from skateboarding including, but not limited to, rock climbing, running, walking, dancing, etc. There can also be other sole sections added comprised of various materials with various predetermined hardness.

In addition to skateboarding shoes, the sole 2 may be used in hiking boots, snowboarding boots, running shoes, basketball shoes, BMX shoes and sandals. The components of the shoe have been described with reference to the common construction of athletic shoes, with common terms such as the sole and mid-sole. However, the various components may be made separately and assembled thereafter, or manufactured integrally with one another, such that, for example, the outsole and midsole components are formed together and do not have discrete boundaries. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

Figure 2:
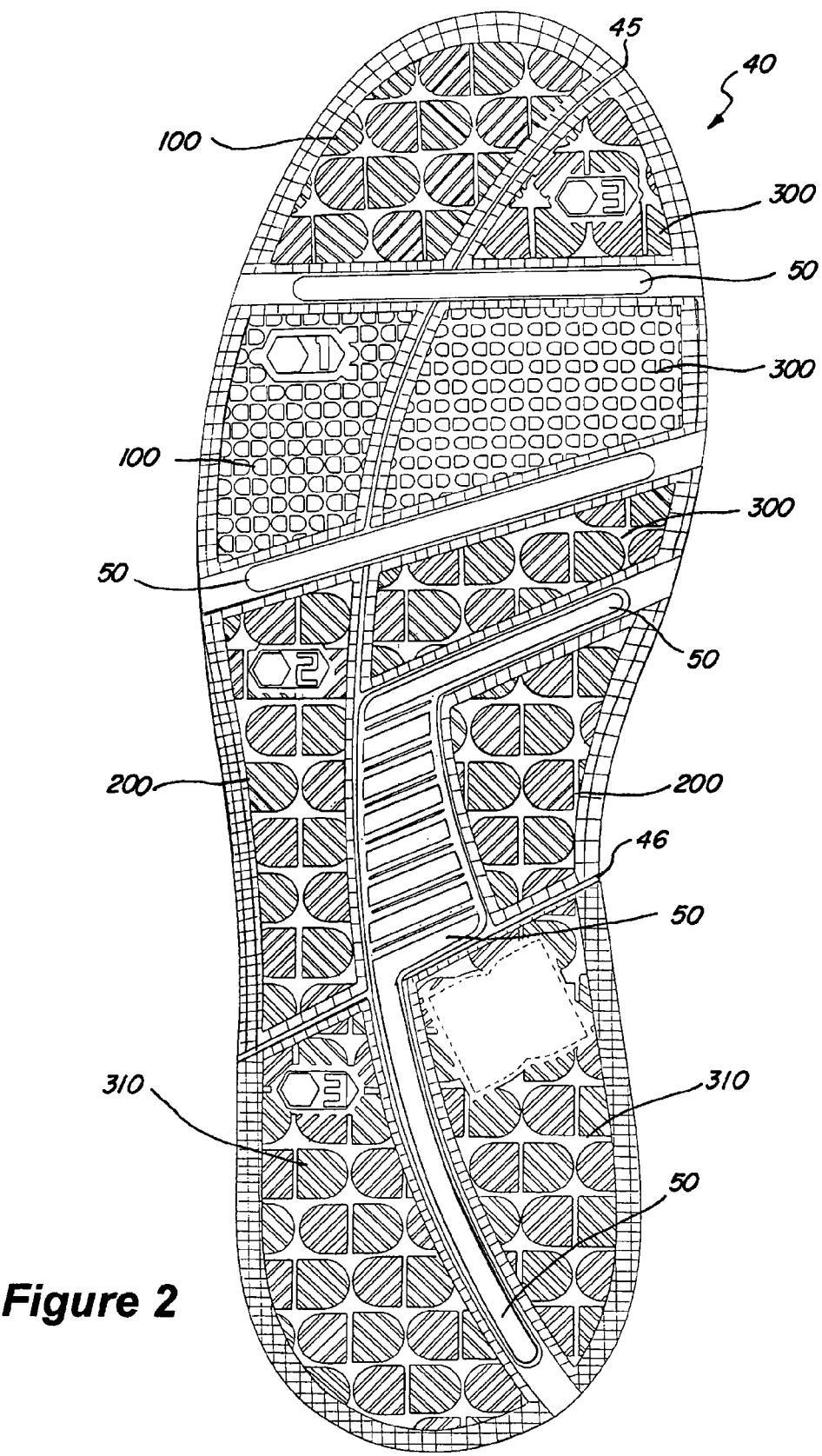
FIG. 2 shows a bottom view of a sole of a skateboard shoe according to a second embodiment of the invention.

FIG. 2 shows a bottom view of a sole 40 of a skateboard shoe according to a second embodiment of the invention. The sole 40 may include a lateral section 100, a medial section 300, an arch section 200, and a heel section 310. The lateral section 100 is separated from the medial section 300 by a channel or line 45. The arch section 200 is separated from the heel section 310 by a channel or line 46. Sections beginning with a 1 are made from a first material, sections beginning with a 2 are made from a second material, and sections beginning with a 3 are made from a third material. The first material is softer than the second material, which is softer than the third material. Hence, the first material is the softest rubber material and the third material is the hardest rubber material. The sole 40 may also include cutouts 50 that expose a midsole of the skateboard shoe. The mid-sole may be made of an EVA material. Below is Chart I showing an example of the composition of the first, second, and third materials. Other compositions or other chemical compositions may be used.

Chart I

| First Material - Butyl Rubber Material Durometer 50-55 Type A | | Second Material - Gum Rubber Material Durometer 58-64 Type A | | Third Material - Carbon Rubber Material Durometer 65-70 Type A | |
|---|---|---|---|---|---|
| Chemical Composition | % | Chemical Composition | % | Chemical Composition | % |
| Butyl | 30 | Natural Rubber | 29 | Natural Rubber | 8 |
|  |  | Special Synthetic Rubber | 25 | Special Synthetic Rubber | 15 |
|  |  | Synthetic Rubber | 20 | Synthetic Rubber | 34 |
| Abrasion Coupling | 3 | Abrasion Coupling | 3 | Abrasion Coupling | 2 |
| Silica | 18 | Silica | 17 | Silica | 5 |
| Others | 29 | Others | 6 | Others | 8 |
|  |  |  |  | Carbon | 28 |
|  | 100 |  | 100 |  | 100 |

In another embodiment, the lateral section 100 may be made of a butyl rubber material, the medial section 300 may be made of a carbon rubber material, the arch section 200 may be made of a gum rubber material, and the heel section 310 may be made of a carbon rubber material. Hence, the medial section 300 and the heel section 310 are made out of the same material. The relative hardness of the heel section 310 promotes efficient application of downward force on the skateboard during maneuvers in which the skateboarder must assert downward force. With this construction of the sole 40, the medial and heel sections 300 and 310 are harder than the arch section 200, and the arch section 200 is harder than the lateral section 100. The lateral section 100, the arch section 200, the medial section 300, and the heel section 310 may be integrally formed with the mid-sole of the shoe or may be referred to as an exposed area of the midsole even though it functions as the outsole.

A shoe comprising a single molded sole 40 having a lateral section 100, positioned at a front outer portion of the sole 40, the lateral section 100 made of a first rubber material, a medial section 300, positioned at a front inner portion of the sole 40 and positioned adjacent to the lateral section 100, the medial section 300 made of a third rubber material, a heel section 310, positioned at a rear portion of the sole 40, the heel section 310 made of the third rubber material, and an arch section 200, positioned between the lateral section 100 or the medial section 300 and the heel section 310, the arch section 200 made of a second rubber material.

Skate boarding is an intense sport that often requires a user to do many things while the user is riding a skateboard. For example, the user generally grips the skateboard with one foot and runs with the other foot. The user might also need to brake by sliding his foot on the ground. Furthermore, the user might also need to arch his foot in various angles when doing stunts on the skateboard. Since the user will probably be wearing shoes on his feet, there is a need for shoe with a sole of varying hardness and gripping patterns that can accomplish the above tasks.

This invention seeks to solve that problem by dividing the sole into various sections and utilizing various materials with different hardness and/or patterns on various sections.

By dividing the sole into various sections and utilizing various materials with different hardness and patterns on various sections, the sole is more flexible and allows the soles to be more suited for use in the various tasks that a skateboarder might perform. For example, one section can have a soft material that maintains a better grip on surfaces to allow the user to better grip the skateboard. Another section can have a hard material that is more durable to allow the user to use the section as a brake when rubbing it against the ground. Yet another section can have a material with a hardness in-between the section with the hard material and the section with the soft material. This can provide a hybrid of grip and durability.

In use, the shoes constructed as described will be worn by a skateboarder while skateboarding. For maneuvers which require application of downward force to the skateboard, the rider will apply force in the customary fashion, by stomping on the board with the heel or other parts of the foot, but such forces will be applied more efficiently than they would with typical athletic shoes. For maneuvers which require application of lateral forces on the skateboard, the rider applies force in the lateral direction in the customary manner, by swiping the board with the outer or inner edge of the shoes, but the swiping force will be more efficiently transferred to the skateboard vis-a-vis the same action with typical athletic shoes. Thus, the rider will have more control over the skateboard and will be better able to perform tricks and maneuvers.

The skateboard shoe described above can be made with many modifications from the materials and specific construction shown in the illustrations. Many elastomers and plastics can be used in place of the materials mentioned, which are merely the currently preferred materials. The specific structure of the sections may be varied while providing substantial coverage of the corresponding areas with the desired hardness and interoperability with the rider and skateboard. The sections need not be discrete, and may be co-molded or integrally formed as a single piece with areas of differing hardness corresponding to the illustrated sections, and they may be co-molded or integrally formed with the midsole or other components of the shoe. Thus, while the preferred embodiments of the devices and methods have been described in reference to the environment in which they were developed, they are merely illustrative of the principles of the inventions.

Other embodiments and configurations may be devised without departing from the spirit of the inventions and the scope of the appended claims.

The previous description of the disclosed examples is provided to enable any person of ordinary skill in the art to make or use the disclosed apparatus. Various modifications to these examples will be readily apparent to those skilled in the art, and the principles defined herein may be applied to other examples without departing from the spirit or scope of the disclosed apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A shoe comprising:
   a single molded sole having
   a lateral section, positioned at a front outer portion of the sole, the lateral section made of a first rubber material having a first hardness;
   a medial section, positioned at a front inner portion of the sole and positioned adjacent to the lateral section, the medial section made of a third rubber material having a third hardness greater than the first hardness;
   a heel section, positioned at a rear portion of the sole, the heel section made of the third rubber material having the third hardness; and
   an arch section, positioned between the lateral section or the medial section and the heel section, the arch section made of a second rubber material having a second hardness.

2. The shoe of claim 1 wherein the first rubber material is a butyl rubber material.

3. The shoe of claim 1 wherein the second rubber material is a gum rubber material.

4. The shoe of claim 1 wherein the third rubber material is a carbon rubber material.

5. The shoe of claim 1 wherein the second hardness is greater than the first hardness.

6. The shoe of claim 5 wherein the third hardness is greater than the second hardness.

7. The shoe of claim 1 further comprising a channel extending between the lateral section of the sole and the medial section of the sole for separating the lateral section and the medial section.

8. The shoe of claim 7 further comprising a second channel extending between the arch section of the sole and the heel section of the sole for separating the arch section and the heel section.

9. The shoe of claim 8 further comprising a cutout in the sole that exposes a midsole of the shoe, the cutout intersecting with the channel.

10. The shoe of claim 9 further comprising a second cutout in the sole that exposes the midsole of the shoe, the second cutout intersecting with the second channel.

11. A single molded sole of a shoe comprising:
    a lateral section made of a butyl rubber material having a first hardness;
    a medial section, positioned adjacent to the lateral section, the medial section made of a carbon rubber material having a third hardness greater than the first hardness;
    a heel section made of the carbon rubber material having the third hardness; and
    an arch section, positioned between the lateral section or the medial section and the heel section, the arch section made of a gum rubber material having a second hardness greater than the first hardness and less than the third hardness.

12. The sole of claim 11 further comprising a channel extending from a location on a perimeter of the shoe and separating the lateral section from the medial section.

13. The sole of claim 11 further comprising a second channel extending from a second location on the perimeter of the shoe and separating the arch section from the heel section.

14. The sole of claim 13 further comprising a cutout for exposing a midsole, the cutout intersecting with the channel that separates the lateral section from the medial section.

15. The sole of claim 14 further comprising a second cutout for exposing the midsole, the second cutout intersecting with the second channel that separates the arch section from the heel section.

* * * * *